(12) United States Patent
Resendez et al.

(10) Patent No.: US 10,270,209 B2
(45) Date of Patent: Apr. 23, 2019

(54) CABLE CONNECTOR

(71) Applicant: Molex, LLC, Lisle, IL (US)

(72) Inventors: Javier Resendez, Streamwood, IL (US); Kenneth Janota, Conway, AR (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/549,333

(22) PCT Filed: Feb. 10, 2016

(86) PCT No.: PCT/US2016/017350
§ 371 (c)(1),
(2) Date: Aug. 7, 2017

(87) PCT Pub. No.: WO2016/130676
PCT Pub. Date: Aug. 18, 2016

(65) Prior Publication Data
US 2018/0040982 A1    Feb. 8, 2018

Related U.S. Application Data

(60) Provisional application No. 62/114,197, filed on Feb. 10, 2015.

(51) Int. Cl.
*H01R 13/635* (2006.01)
*G06F 1/18* (2006.01)
(Continued)

(52) U.S. Cl.
CPC .......... *H01R 13/635* (2013.01); *G06F 1/183* (2013.01); *H01R 13/508* (2013.01);
(Continued)

(58) Field of Classification Search
CPC ............. H01R 13/635; H01R 13/508; H01R 13/5804; H01R 13/6272; H01R 13/6658;
(Continued)

(56) References Cited

U.S. PATENT DOCUMENTS

| | | |
|---|---|---|
| 7,134,914 B1 | 11/2006 | Wu |
| 7,318,740 B1 | 1/2008 | Henry et al. |
| 7,349,200 B2 | 3/2008 | Hardt et al. |
| 7,651,361 B2 | 1/2010 | Henry et al. |
| 7,666,023 B2 | 2/2010 | Wu |
| 8,360,798 B2 | 1/2013 | Gabrielsson |

(Continued)

FOREIGN PATENT DOCUMENTS

| | | |
|---|---|---|
| CN | 101814674 A | 8/2010 |
| CN | 102484338 A | 5/2012 |

(Continued)

*Primary Examiner* — Edwin A. Leon
(74) *Attorney, Agent, or Firm* — Molex, LLC

(57) ABSTRACT

A cable connector assembly includes a first connector configured to mate with a second connector. The first connector has a first housing that supports a wafer with a first mating portion defined by the first housing and the wafer. The first connector includes a cable connected to the wafer that is disposed in a first housing. The first connector also includes a second housing with a latch and the second housing is movably mounted to the first housing. A biasing element disposed between the first housing and the second housing acts to urge the first housing and the second housing apart.

14 Claims, 8 Drawing Sheets

(51) Int. Cl.
*H01R 13/508* (2006.01)
*H01R 13/58* (2006.01)
*H01R 13/627* (2006.01)
*H01R 13/66* (2006.01)
*H01R 13/633* (2006.01)
*H01R 107/00* (2006.01)

(52) U.S. Cl.
CPC ..... *H01R 13/5804* (2013.01); *H01R 13/6272* (2013.01); *H01R 13/6658* (2013.01); *H01R 13/6275* (2013.01); *H01R 13/6335* (2013.01); *H01R 2107/00* (2013.01)

(58) Field of Classification Search
CPC .. H01R 13/6335; H01R 2107/00; G06F 1/183
USPC ........................................................ 439/352
See application file for complete search history.

(56) References Cited

U.S. PATENT DOCUMENTS

| | | | |
|---|---|---|---|
| 8,480,432 B2 * | 7/2013 | Wu | H01R 13/5812 439/353 |
| 8,770,990 B2 * | 7/2014 | Sytsma | H01R 9/034 439/76.1 |
| 9,748,713 B2 * | 8/2017 | Regnier | H01R 9/038 |
| 2012/0214327 A1 | 8/2012 | Reed et al. | |

FOREIGN PATENT DOCUMENTS

| | | |
|---|---|---|
| CN | 202523914 U | 11/2012 |
| CN | 104183978 A | 12/2014 |
| CN | 104218386 A | 12/2014 |

* cited by examiner

CABLE CONNECTOR

RELATED APPLICATIONS

This application claims priority to U.S. Provisional Application No. 62/114,197, filed on Feb. 10, 2015 which is incorporated herein by reference in its entirety.

FIELD OF THE INVENTION

The current disclosure is directed to the field of cable connector assemblies and more particularly to a cable connector assembly with a spring-loaded backshell latching body.

DESCRIPTION OF RELATED ART

With any typical backshell latching connector cable solution, there is always a chance of the cable assembly connector not being fully seated in the receiving connector due to tolerance stack up—accounting for parts normal process variation and clearances between the latching components and corresponding catch point of a mating connector assembly, this results in degradation of SI performance (e.g., Impedance, Return Loss, Xtalk).

In these types of connector assemblies, the complexity and the sheer number of components lead to this tolerance stackup. Typically, this leads to a loose fit between a plug and receptacle and the consequently and unstable connection. Examples of this can be un-intention un-mating due to vibration, user error in the sense that the connectors are not fully inserted. Certainly, individuals can appreciate a cost effective improved connector latching system that accounts for this stackup and minimizes the possibly of incomplete mating of a plug and receptacle cable connector system.

BRIEF SUMMARY

According to the disclosure an embodiment, a cable connector system is provided that includes a cable connector having a latching mechanism and a receptacle connector configured to mate with the cable connector and be securely retained by the latching mechanism. The latch mechanism is integrated into the cable connector and includes an integrated pull member that actuates a locking hook. By grasping the pull, an actuation member formed in the pull deflects the locking member out of engagement with a retention member formed on the receptacle.

In an embodiment of the cable connector system, the cable connector or plug connector includes a moveable spring loaded backshell assembly which is incorporated into the cable connector by the use of a spring-loaded latching body, axially coupled to the main backshell cable connector body via guide pins, springs and shoulder screws. The guide pins provide guidance and alignment for the moveable body. The springs provide the force to overcome initial mating force and the system for absorbing physical tolerances, resulting in the cable connector being spring loaded in the mating direction within the receiving connector. The shoulder screw retains the moveable body to the main backshell body and allows relative movement between the mating portion of the cable connector and the latching portion of the cable connector.

BRIEF DESCRIPTION OF THE DRAWINGS

The present invention is illustrated by way of example and not limited in the accompanying figures in which like reference numerals indicate similar elements and in which.

DETAILED DESCRIPTION

The appended figures illustrate an embodiment of a cable connector assembly 10 and it is to be understood that the embodiment described and illustrated is merely exemplary of the disclosure, which may be embodied in different forms. Therefore, specific details disclosed herein are not to be interpreted as limiting, but merely as a basis for the claims and as a representative basis for teaching one skilled in the art to variously employ the present disclosure.

One or more embodiments of the disclosure utilize a modular construction and are typically used in the area of high data rate signal transmission that generally include a cable connector and a backplane connector. The cable connector typically includes a plurality of wafers disposed in a housing with a multi conductor cable conducted to individual terminals within the wafers. The cable connector is configured to be mated to a backplane or to other suitable receptacles that may also include a plurality of wafers with integrally molded terminals. The receptacle includes a cage or can be mounted in a cabinet with panel access. Typical equipment include servers and other telecommunications hardware.

Figure 1:
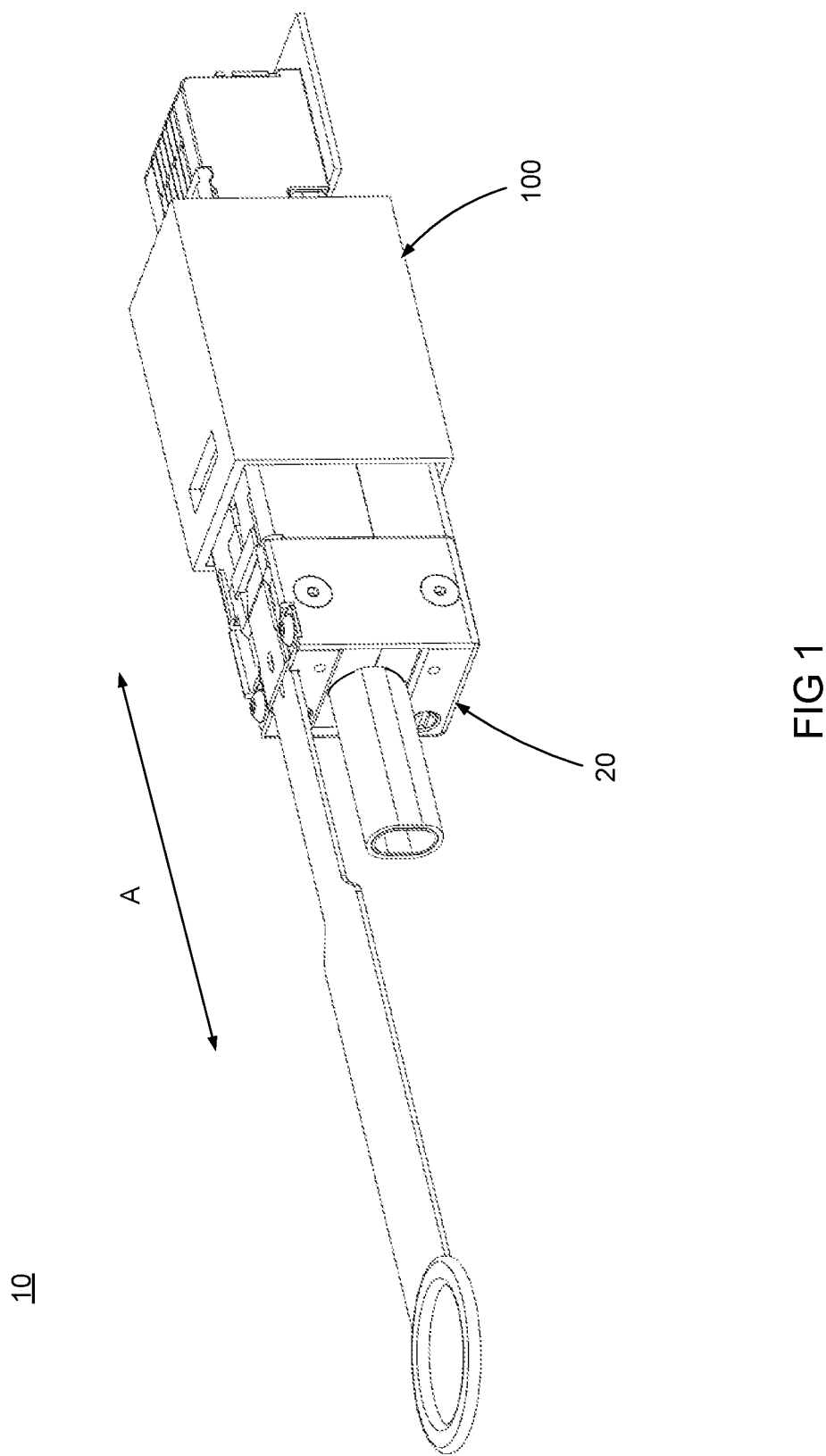
FIG. 1 is a perspective view of the cable connector assembly.
Figure 2:
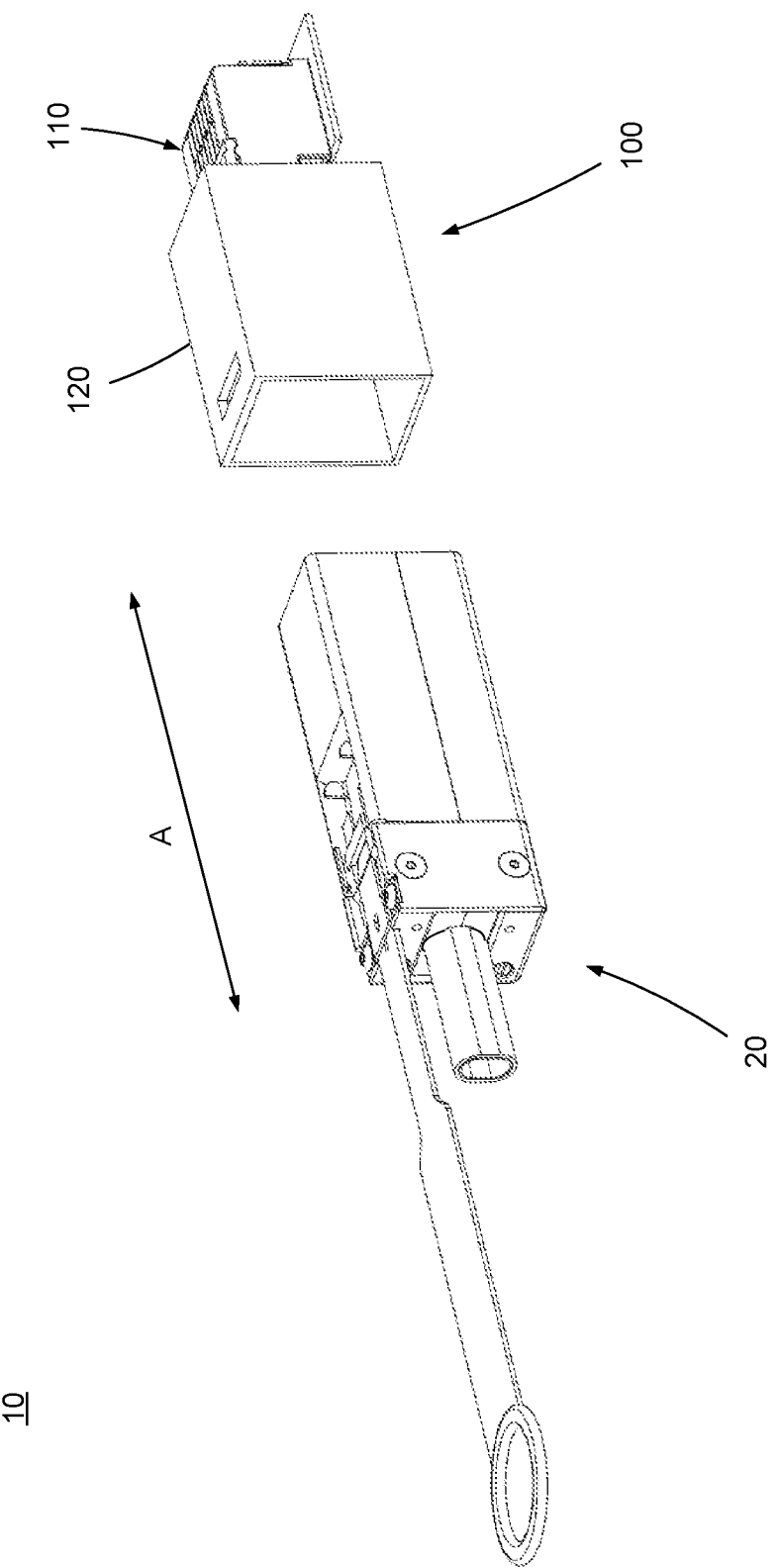
FIG. 2 is a partial exploded view of the cable connector assembly of FIG. 1.

As best shown in FIGS. 1 and 2 the cable connector assembly 10 includes a first connector 10 and a second connector 100, and within the scope of this description, the first connector is referred generally as a plug and the second connector generally as a receptacle. The plug 10 and receptacle 100 are connected together or mated along a mating direction or insertion direction A. The receptacle 100 typically is configured as a backplane or right angle type connector 110 is mounted on a circuit board. The receptacle 100 is generally housed with a cabinet or cage and for simplicity, is shown to be disposed in a box 120. The box 120 being adapted to receive the plug connector 20.

Figure 3:
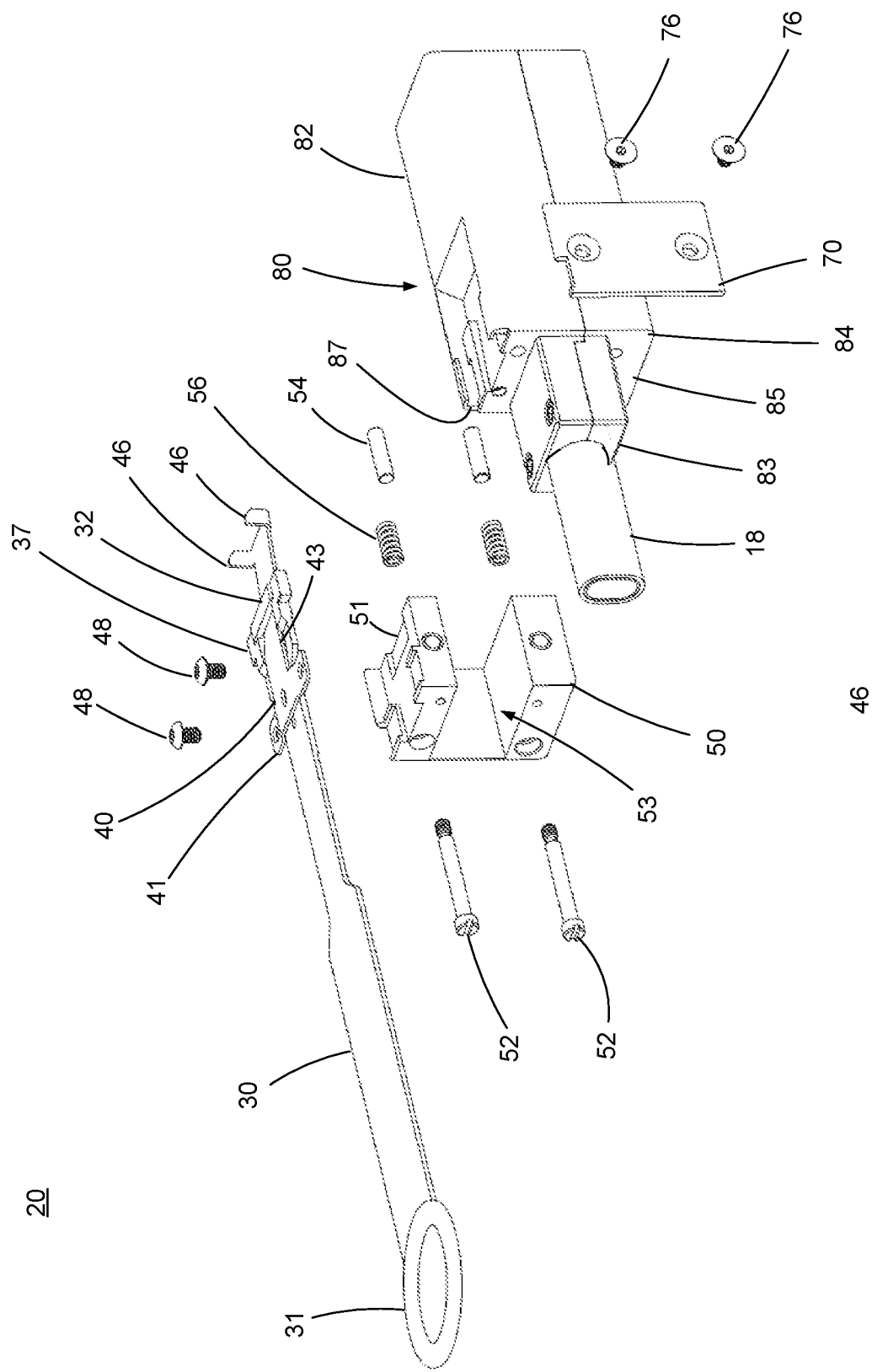
FIG. 3 is an exploded view of the cable connector of the cable connector assembly of FIG. 1.

A best shown in FIG. 3, the plug 20 includes a cable connection portion 80 having a first housing 82 and a cover 84. A plurality of wafers (not shown) are positioned within the connection portion 80. The housing 82 and cover 84 are secured together by screws with the wafers retained therein. A multi conductor cable 18 is adapted to be connected to the individual terminals with each wafer and exits a rear portion of connection portion 80. The plug 20 further includes a second housing 50 and respective wall 70 which are also secured together by screws 76. Dowels 54, springs 56 and shoulder screws hold the second housing 50 to the first housing 82 and cover 84. A latching mechanism including a pull 30 and bracket 40 are in turn secured to the second housing 50 by additional screws 48.

Figure 4:
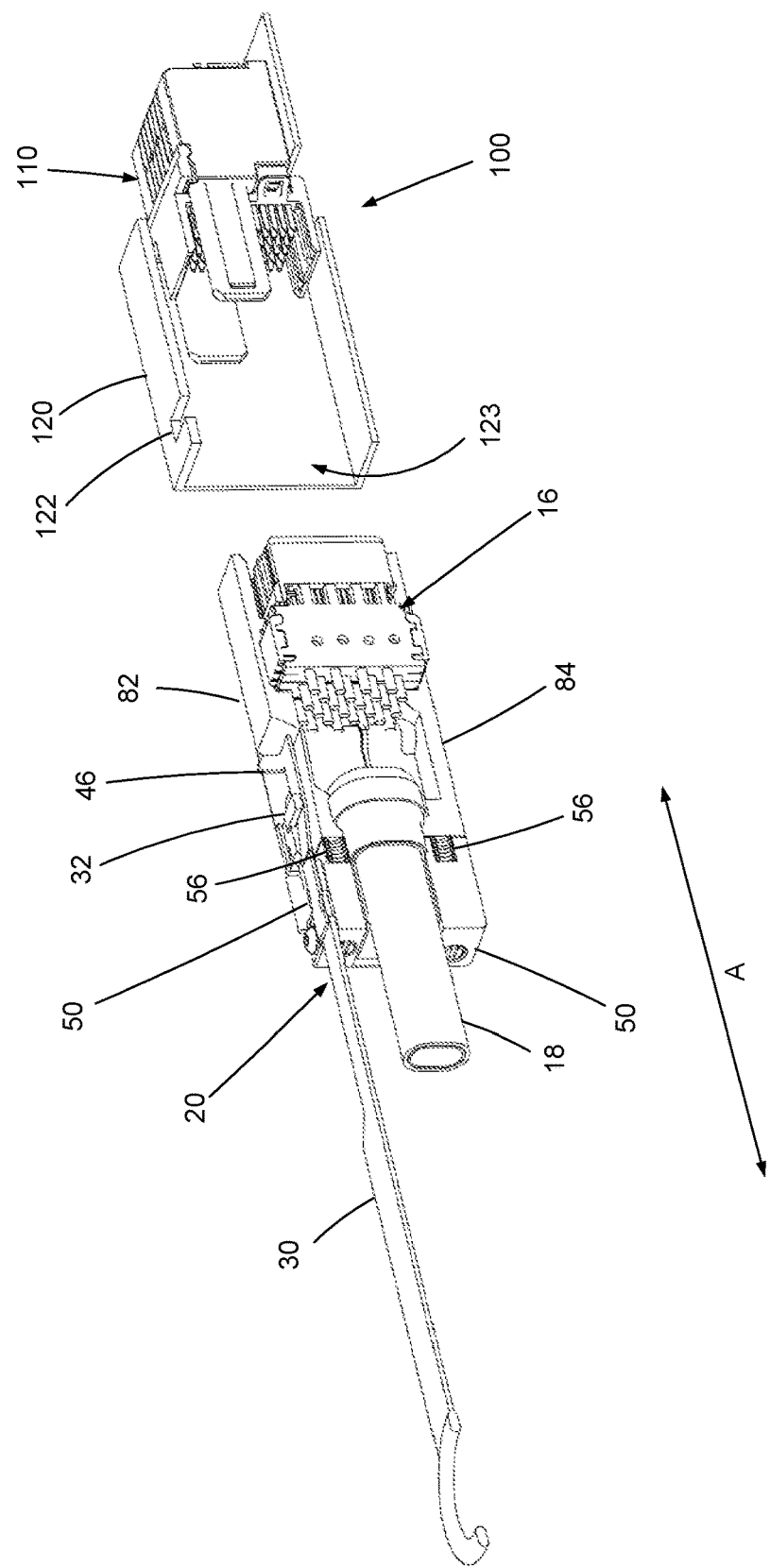
FIG. 4 is a perspective sectional view of the cable connector assembly with the cable connector unmated from the receptacle.
Figure 5:
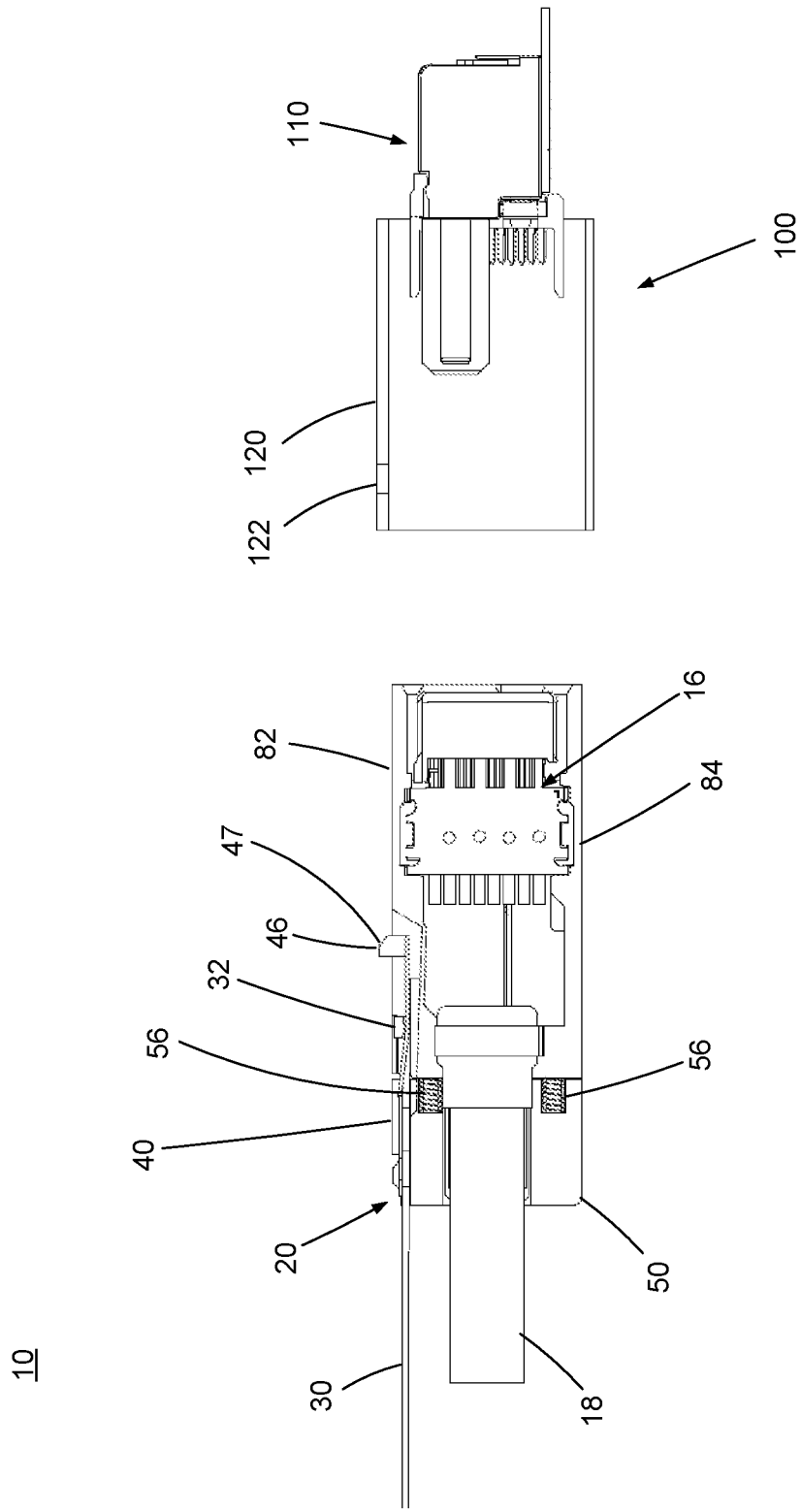
FIG. 5 is a sectional view of the cable connector assembly of FIG. 4.

As best illustrated in FIGS. 3-5, the construction of the plug 20 will now be described. The plug 20 includes a connection portion 80. The connection portion 80 includes a main housing 82 and a cover 84 that cooperatively form a cavity therein. Within the cavity a wafer 16 is disposed and positioned with a channel formed in the housing 82 and cover 84 to align and secure the wafers 16 therein. A cable 18 including a plurality of conductors is connected to the wafer 16. In the embodiment shown, the individual conductors are omitted from the illustrations to simplify the description. Each wafer includes a plurality of electrical terminals integrally molded within a frame creating. Multiple wafers are arranged in a side by side relationship and inserted into the main housing 82 and secured in place by the cover 84. Each individual conductor of the cable is soldered or welded to an appropriate mounting tab on the terminal completing the connection portion of the plug 20.

As further illustrated in FIG. 3, a second housing 50 is mounted to the cable side portion of the connection portion 80 of the plug 20. The second housing 50 includes a space 53 formed that is adapted to fit over a protruding portion 83 formed on the main housing 82 and cover 84 of the connection portion 80. As further illustrated, when the second housing 50 is mounted on the protruding portion 83, a first surface 51 of the second housing 50 confronts a second surface 85 formed on the housing 82 and cover 84 of the connection portion 80. The space 53 and the protruding portion 83 are similar in shape and allows for relative movement of the connection portion 80 to the second housing 53 the mating direction A.

To align the second housing 50 to the first connection portion 80, dowels 54 are positioned in respective recesses formed in the first surface 51 and the second surface 85, allowing translation in the mating direction A. Helical coils springs 56 are placed in corresponding location holes formed in the second housing 50 on the first surface 51 and abut the confronting second surface 85. The length of each helical coil spring is greater than the depth of the location holes they are received in, therefore a portion of each spring 56 extends beyond the first surface 51. Shoulder screws 52 are inserted through the second housing 50 and threaded into mounting holes formed in the main housing 82 and cover 84 securing the second housing 50 to the connection portion 80. In this configuration, the helical coil springs 56 are compressed and affect a separating force between the connection portion 80 and the second housing 50. This is best illustrated in FIGS. 4-5.

The helical coil springs 56 have specific geometry to meet certain force characteristics of the cable connector assembly 10. In this case, the helical coils springs 56 are design to exhibit a substantial separating force in the amount equal to the mating force of the connector system 10 or even slightly greater. In the embodiment shown, helical coil springs 56 were used, but other biasing elements can be adapted for this purpose, these include but are not limited to leaf springs and torsion springs. The built up separating force between the connection portion 80 and the second housing 50 is required to compensate for slop and uncertainty due to tolerances.

A latching mechanism including a pull 30 and a bracket 40 is secured to the second housing 50. The pull 30 is formed from a flexible material and includes a finger grip 31 formed at one end and an actuator 32 formed at a second end of the pull 30. As best shown in FIG. 3 the bracket 40 includes a mounting portion 41 and locking portion 46 with an intermediate body portion 43 connecting both ends. The body portion 43 of the bracket 40 is positioned between the actuator 32 of the pull 30 and the second housing 50 as best shown in FIGS. 4 and 5. Additionally, wing portions 37 formed on the pull 30 are formed adjacent the actuator 32 and are disposed in channels 87 formed in the main housing 82 whereby to guide and retain the actuator 32 of the pull 30. The bracket 40 is secured to the second housing 50 by screws 48. A wall 70 is secured to the second housing 50 by screws 76 to laterally retain the second housing 50 to the connection portion 80.

Figure 6:
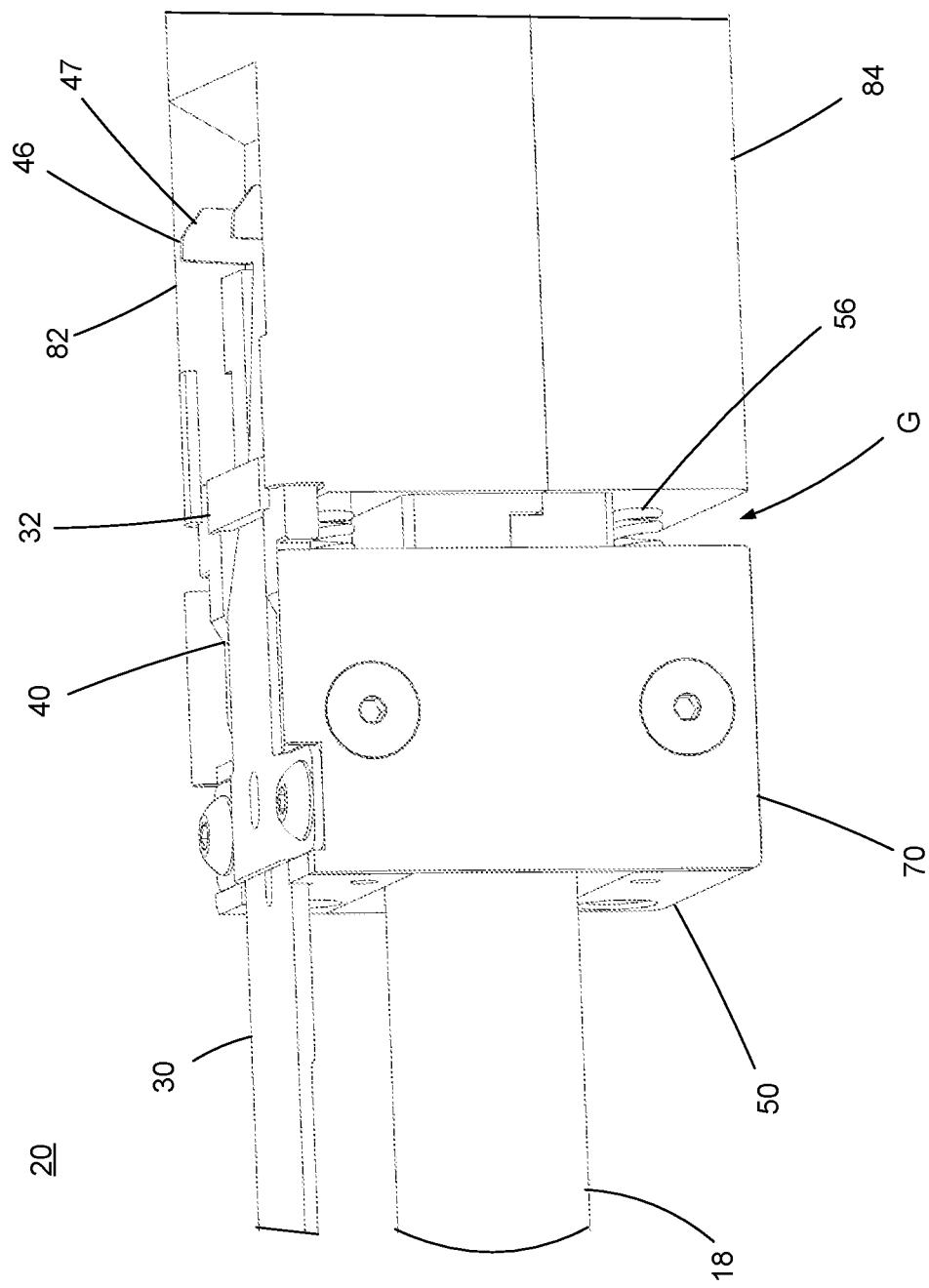
FIG. 6 is a detailed view of the latching mechanism of the cable connector.

Upon complete assembly of the plug 20, as depicted in FIG. 6, the second housing 50 is movable with respect to the housing parts 82, 84 of the connection portion 80. The second housing 50 with the attached latching mechanism translates in an axial direction A, riding on the shoulder screws 52. The shoulder screws 52 limit the translation along the mating direction A. As further illustrated, a gap G is defined between the connection portion 80 and the second housing 50 which represents the amount of travel or stroke between the connection portion 80 and the second housing 50. It should be noted that gap G as shown in FIG. 6 is exaggerated to illustrated amount of translation previously stated. The gap G is defined by the specific application and usage of the cable connector system 10. Some application may require additional float or compensation sue to the amount of play within the connector system 10.

Figure 7:
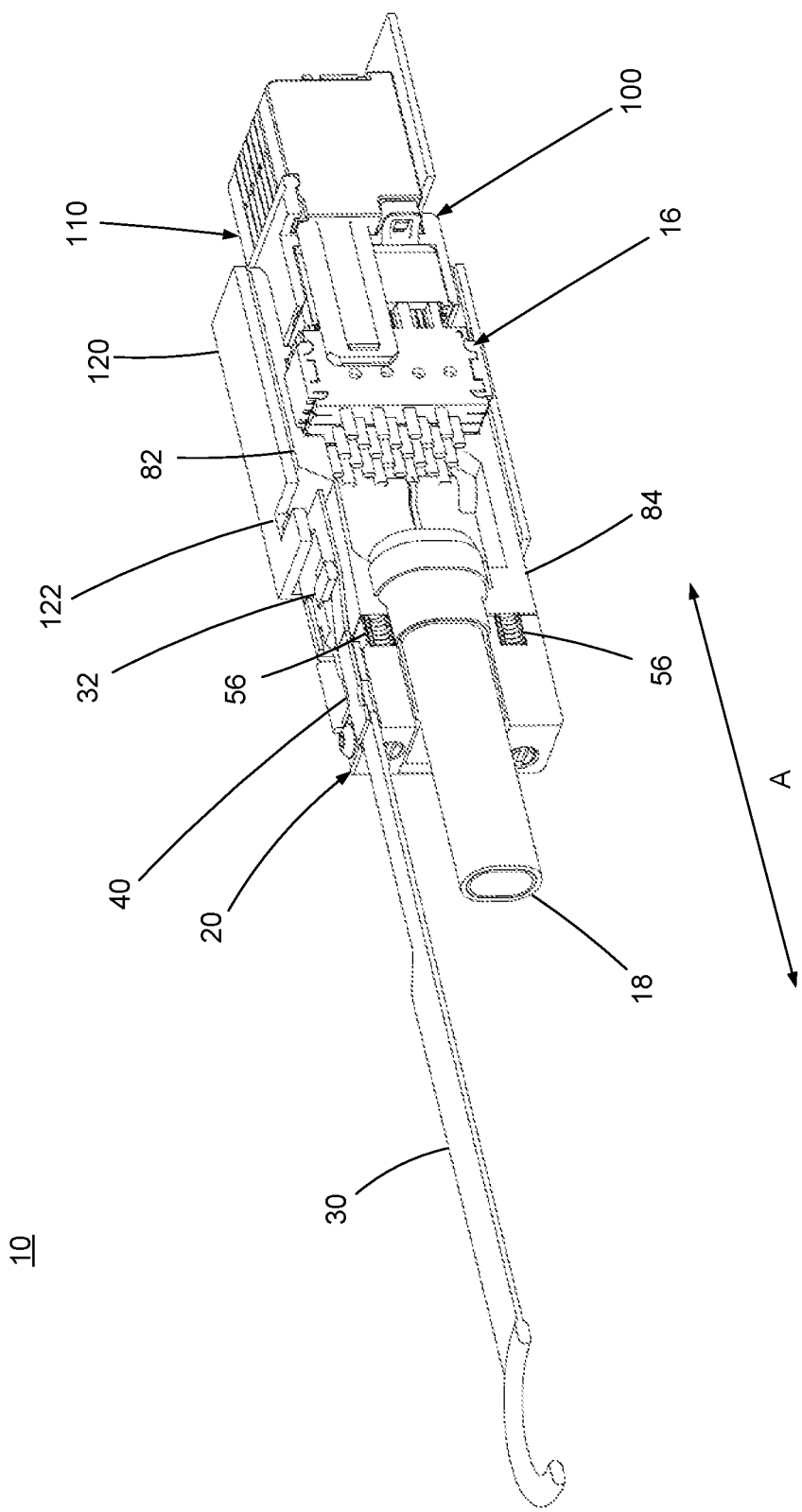
FIG. 7 is a perspective sectional view of the cable connector assembly.
Figure 8:
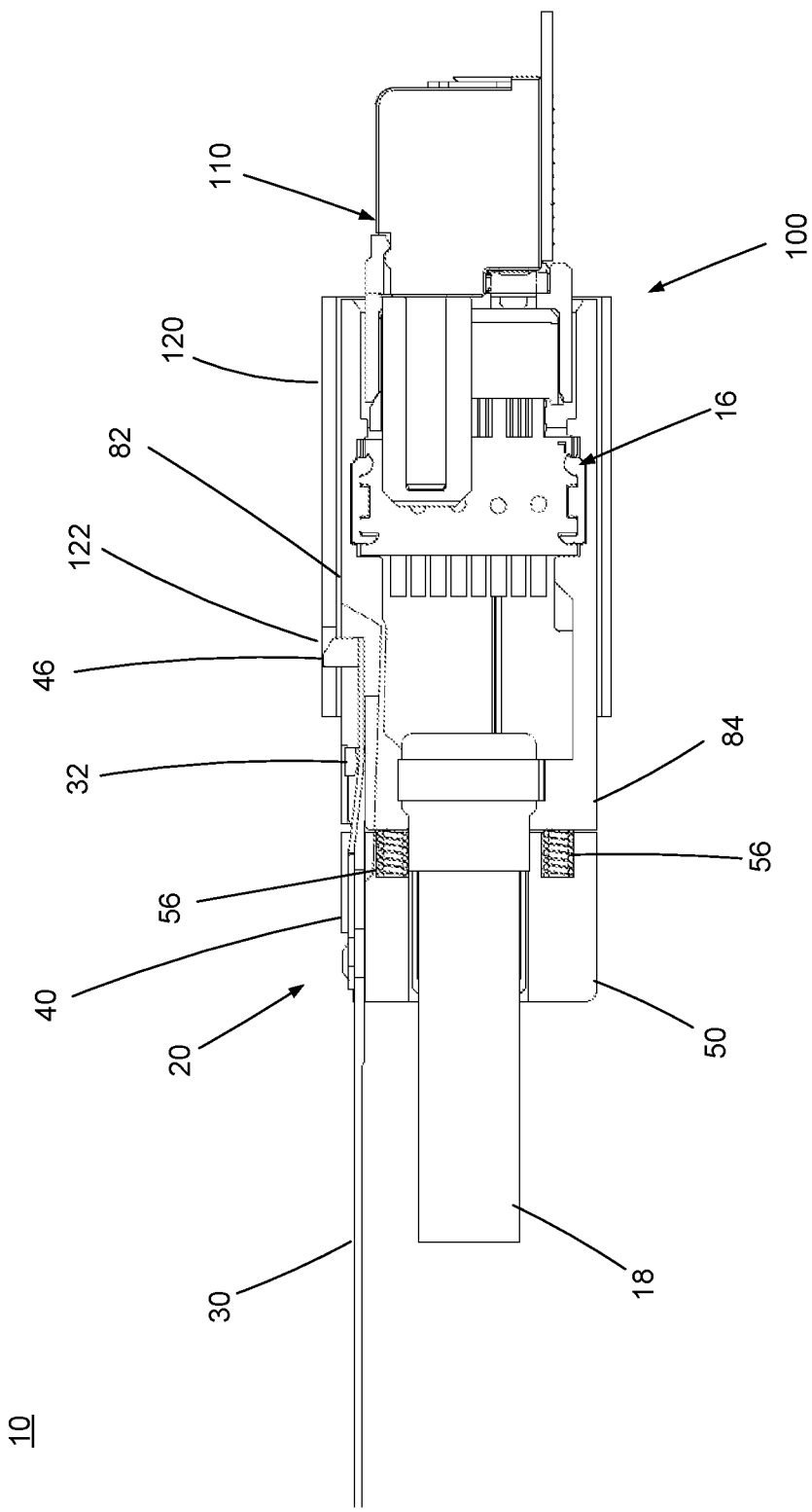
FIG. 8 is a sectional view of the cable connector assembly of FIG. 6.

As shown in FIGS. 7-8, the cable connector assembly 10 is shown in its fully coupled state, that is, electrical connections are made between corresponding electrical terminals of both the plug 20 and receptacle 100 and the connectors 20, 100 are mechanically locked together. In operation, this is accomplished by first aligning the plug 20 with the opening 123 of the box 120 in the receptacle 100. The plug 20 is advanced within the opening 123 and engagement between the electrical terminals of each wafer is initiated. Upon further insertion, the terminals of respective wafers mated further and the locking portion 46 of the bracket 40 engages the box 120. The ramped portions 47 of the locking portion 46 ride on the edge of the box 120 and deflect the locking portion 46 of the bracket 40. Upon complete insertion the locking portion 46 enters the windows 122 formed in the box 120 which secure the plug 20 to receptacle 100.

Once the plug 20 is completely mated with the receptacle 100, the separating force developed between the connection portion 80 and the second housing 50 is now transferred to the mating interface between the connection portion 80 of the plug 20 and the waters 16 of the receptacle 100. This is explained further by looking at the elements that are linked together in the mated assembly, similar to evaluating a tolerance stack-up. A direct mechanical connection is present between the box 120 and the wafers 16, essentially locking the position of these elements together. The mating of the plug 20 to receptacle 100 creates a direct connection between the latching mechanism and the second housing 50 of the plug 20 to the box 120. Since the latching mechanism is directly connected to the second housing 50, the separating force is now transferred from the second housing 50 to the box 120 due to this direct connection. This results in the separating force being transferred to the mating interface between the connection portion 80 and the wafers 16. In other words, the connection portion 80 of the plug 20 is biased in a connection direction to the wafers 16 and therefore minimizing any potential unmated conditions.

In another usage, an excessive amount of compensation can be added to the cable connector system 10 to provide feedback to assure that the plug 20 and receptacle 100 are actually completely connected. This can be illustrated by way of example. With an increased compensation, the plug 20 and receptacle 100, upon mating, the locking portion 46 of latching mechanism must be received in the window 122 of the box 120 to assure complete mating. If this is not the case, the movable portion of the plug 20, the second housing 50 and latching mechanism, will be automatically forced out of the box 120, indicating that the locking portion 46 is not received in the window 122 and consequently, the plug 20 is not latched to the box 120 and connection is not made To disconnect the plug 20 and the receptacle 100, the pull 30 of the latching mechanism is grasped and retracted. The actuator 32 of the pull rides along channels 87 and deflects the locking portion 46 out of engagement with the windows 122 of the box 120. The plug can now be removed from the box 120 and unmating is accomplished.

It will be understood that there are numerous modifications of the illustrated embodiments described above which will be readily apparent to one skilled in the art, such as many variations and modifications of the compression connector assembly and/or its components including combinations of features disclosed herein that are individually disclosed or claimed herein, explicitly including additional combinations of such features, or alternatively other types of contact array connectors. Also, there are many possible variations in the materials and configurations.

We claim:

1. A connector comprising:
a main housing having a protrusion and a cover defining a cavity;
a plurality of wafers positioned in the cavity;
a cable assembly including a plurality of differential pair cables, the differential pair cables connected to terminals respectively supported by the plurality of wafers;
a second housing having a wall that defines a space that receives the protrusion, the second housing attached to the main housing in a slidable manner;
a latching member mounted on the second housing, the latching member including a pull movably mounted to the second housing by a bracket, the bracket having a locking portion; and
a biasing member disposed between the main housing and the second housing, the biasing member urging the second housings apart.

2. The connector of claim 1, wherein the biasing member is a coil spring.

3. The connector of claim 1, wherein the bracket is made from metal.

4. The connector of claim 1, wherein the second housing includes two walls that define the space.

5. The connector of claim 1, wherein the second housing is mounted to the main housing by collar screws.

6. The connector of claim 1, wherein an actuating portion is formed on the pull, the actuation portion configured to deflect the locking portion.

7. The connector of claim 1, wherein the locking portion is a hook.

8. The connector of claim 1, wherein the cable is securely retained by the main housing.

9. A connector comprising:
a first connector including a housing and a plurality of wafers at least partially positioned within the housing, the housing and the wafers defining a first mating portion, the housing disposed in a mounting box, the mounting box having an opening and an aperture formed in the mounting box; and
a second connector, the second connector configured to be inserted into the opening, the second connector including:
a main housing defining a cavity and a plurality of wafers positioned in the cavity, the wafers having terminals secured within the wafer, the main housing and the wafers defining a second mating portion;
a cable assembly including conductors connected to the terminals held within the wafer,
a second housing having a cover, the second housing fitted to the main housing in a slidable manner, the second housing further including a biasing member disposed between the main housing and the second housing,
a latching member mounted on the second housing, the latching member includes a pull movably mounted to the second housing by a bracket, the bracket having a locking portion; and
wherein the locking portion engages the aperture and the biasing member urges the mating portions of the connectors into engagement.

10. The connector of claim 9, wherein the biasing member is a coil spring.

11. The connector of claim 9, wherein the bracket is made from spring steel.

12. The connector of claim 9, wherein the locking portion is a hook.

13. The connector of claim 9, wherein the second housing of the second connector is secured to the first main housing of the second connector by collar screws.

14. The connector of claim 13, wherein the second housing is aligned to the main housing by a dowel.

* * * * *